US007306386B2

(12) United States Patent
Lyman et al.

(10) Patent No.: US 7,306,386 B2
(45) Date of Patent: Dec. 11, 2007

(54) DOCKING STATION AND ASSOCIATED METHOD FOR DOCKING A PORTABLE PRINTER

(75) Inventors: Roy Patrick Lyman, Coventry, RI (US); Gregory Paul Panebianco, E. Greenwich, RI (US); Stephen A. Petersen, Lincoln, RI (US)

(73) Assignee: ZIH Corp., Hamilton (BM)

( * ) Notice: Subject to any disclaimer, the term of this patent is extended or adjusted under 35 U.S.C. 154(b) by 180 days.

(21) Appl. No.: 10/901,637

(22) Filed: Jul. 29, 2004

(65) Prior Publication Data

US 2006/0024107 A1 Feb. 2, 2006

(51) Int. Cl.
*G06F 1/16* (2006.01)

(52) U.S. Cl. ......................... 400/88; 400/692; 710/303

(58) Field of Classification Search ................ 400/691, 400/692, 693, 88; 361/686, 683, 679; 710/303, 710/304; 348/375; D14/107
See application file for complete search history.

(56) References Cited

U.S. PATENT DOCUMENTS

| | | | | |
|---|---|---|---|---|
| 5,347,115 | A | 9/1994 | Sherman et al. | |
| 5,371,858 | A | 12/1994 | Miller et al. | |
| 5,408,382 | A | 4/1995 | Schultz et al. | |
| 5,410,141 | A | 4/1995 | Koenck et al. | |
| 5,484,991 | A | 1/1996 | Sherman et al. | |
| 5,544,010 | A | 8/1996 | Schultz et al. | |
| 5,590,346 | A | 12/1996 | West et al. | |
| 5,625,180 | A | 4/1997 | Hanson et al. | |
| 5,644,471 | A | 7/1997 | Schultz et al. | |
| 5,816,725 | A | 10/1998 | Sherman et al. | |
| 5,888,087 | A | 3/1999 | Hanson et al. | |
| 5,961,337 | A | 10/1999 | Kordes | |
| 5,978,569 | A | 11/1999 | Traeger | |
| 5,996,896 | A | 12/1999 | Grabon | |
| 6,034,869 | A | 3/2000 | Lin | |
| 6,061,233 | A * | 5/2000 | Jung | 361/686 |
| 6,069,790 | A * | 5/2000 | Howell et al. | 361/686 |
| 6,264,488 | B1 | 7/2001 | Helot et al. | |
| 6,549,416 | B2 | 4/2003 | Sterner et al. | |
| 6,574,102 | B2 | 6/2003 | Usui et al. | |
| 6,648,528 | B2 * | 11/2003 | Hardisty et al. | 400/323 |
| 6,683,786 | B2 | 1/2004 | Yin et al. | |
| 6,741,462 | B2 | 5/2004 | Kamphuis et al. | |
| 2001/0030851 | A1 | 10/2001 | Usui et al. | |
| 2003/0231465 | A1 | 12/2003 | Weng | |
| 2005/0055487 | A1 * | 3/2005 | Tanaka et al. | 710/303 |
| 2006/0092605 | A1 * | 5/2006 | DeLuga et al. | 361/686 |

* cited by examiner

*Primary Examiner*—Leslie J Evanisko
(74) *Attorney, Agent, or Firm*—Alston & Bird LLP

(57) ABSTRACT

According to one embodiment, a docking station and an associated method for docking a portable printer are provided. The portable printer has a printhead, media drive, and media support externally configured to be latched onto the docking station, and the docking station is adapted for convenient one-hand docking and undocking of the portable printer. The docking station includes a base member having a first surface configured to receive the portable printer, and a latching mechanism including a manually operable actuator and coupled thereto one or more latches adapted to automatically engage and securely dock the portable printer on the first surface of the base member when the printer is positioned on the first surface. The actuator is capable of actuating the latch to unlatch a latched printer and to bias the printer outwardly for removal of the printer from the station.

38 Claims, 14 Drawing Sheets

DOCKING STATION AND ASSOCIATED METHOD FOR DOCKING A PORTABLE PRINTER

BACKGROUND OF THE INVENTION

1. Field of the Invention

The present invention relates generally to a docking station and an associated method for docking a portable printer within the docking station.

2. Description of Related Art

Salespersons, deliverers, servers, and others are typically faced with time pressures and multitasking that makes efficient transactions important. For example, a deliverer dropping off a package for a customer would like to make a stop, deliver the package, and verify the delivery with the customer as quickly as possible. Similarly, a waitress would ideally like to handle as many customers and tables as possible, which includes processing of the check. Furthermore, salespersons that spend time away from their desk making sales calls generally need both hands to handle multiple tasks, such as talking on a cellular phone, writing messages, using a laptop computer, or even transacting with customers.

Portable printers provide an ideal way to memorialize transactions, such as those mentioned above. For instance, deliverers could print out delivery receipts, salespersons could print sales receipts, while a waitress could process and print the check for a customer. Because of the increased demand for portability, providing a docking station for a portable printer allows the deliverer, salesperson, server, or others to use the printer remotely, as well as to charge the printer, mount the printer, and/or transfer data between the printer and one or more peripheral devices.

For these and other reasons, it would be advantageous to provide a docking station that cradles the portable printer and allows the docking station and portable printer to be easily mobile. Furthermore, it would be advantageous to provide a docking station that facilitates one-handed docking and undocking of the portable printer. It would also be advantageous to provide a docking station that provides increased protection from potential damage by contact and/or contaminants.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
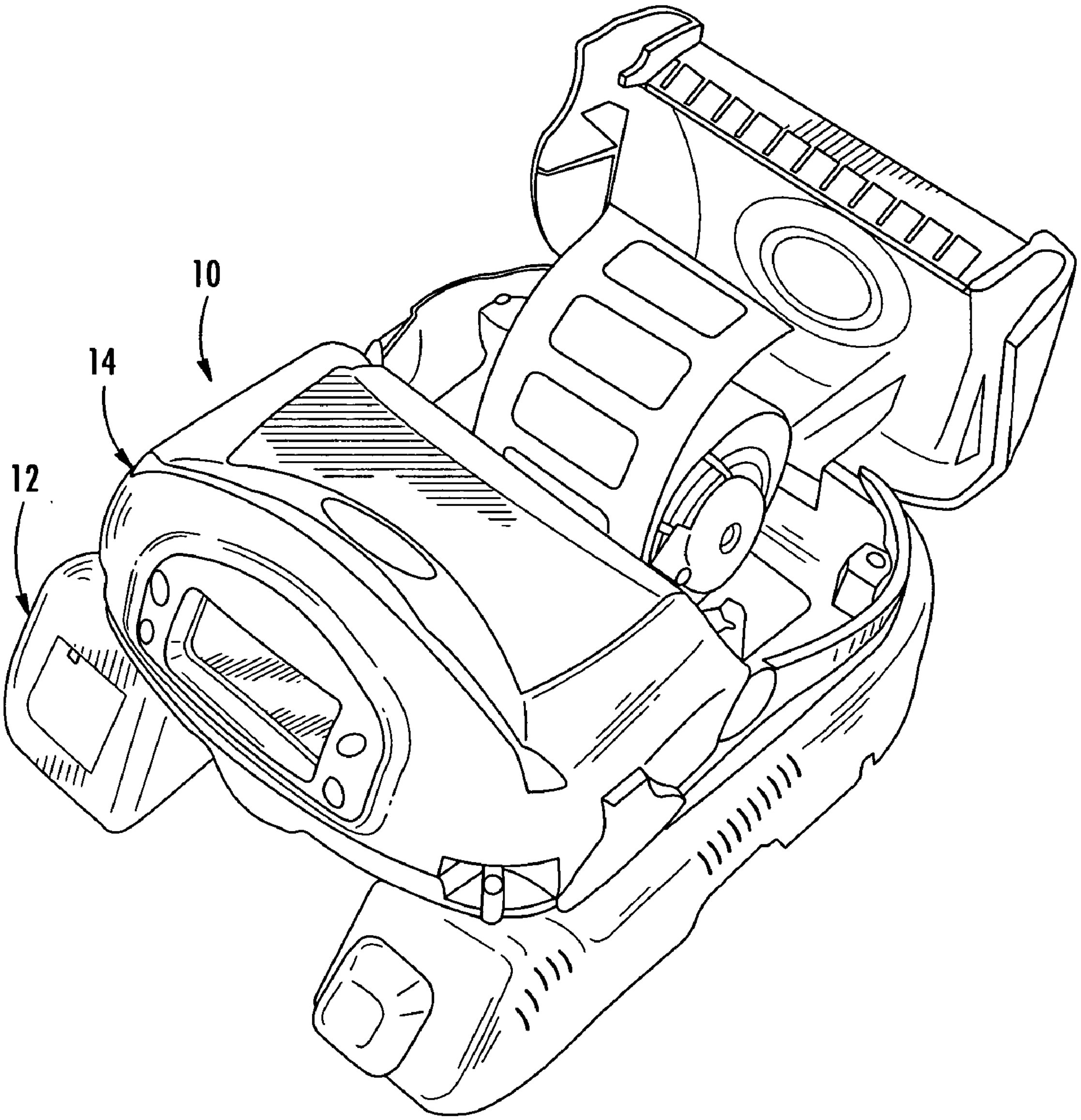
FIG. 1 is perspective view of a system illustrating an electronic device positioned within a docking station, according to one embodiment of the present invention.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention addresses the above needs and achieves other advantages by providing a docking station for docking an electronic device. The docking station includes a latching mechanism positioned within a base member that is capable of moving between an engaging and non-engaging position. While in the engaging position, the electronic device is secured within the docking station and is in electronic communication with the electronic device. Conversely, while in the non-engaging position, the electronic device may be freely removed from the docking station. The docking station also includes a locking mechanism coupled to the latching mechanism that is capable of locking the latching mechanism in the non-engaging position. An actuator is also coupled to the locking mechanism and is operable to move the electronic device between locked and unlocked positions in response to biasing of the electronic device on the actuator.

In one embodiment of the present invention, a docking station for use with a portable printer is provided. The portable printer has a printhead, media drive, and media support externally configured to be latched onto the docking station, and the docking station is adapted for convenient one-hand docking and undocking of the portable printer. The docking station includes a base member having a first surface configured to receive the portable printer, and a latching mechanism including a manually operable actuator and coupled thereto one or more latches adapted to automatically engage and securely dock the portable printer on the first surface of the base member when the printer is positioned on the first surface. The actuator is capable of actuating the latch to unlatch a latched printer and to bias the printer upwardly for removal of the printer from the station.

The latching mechanism may include a locking mechanism configured to prevent self-relatching of the printer during undocking, and the locking mechanism may include an actuator which is inserted through the first surface of the base member and into engagement with the printer to bias the printer upwards against self relatching. The mobile printer may be aligned for cooperative engagement with the docking station latching mechanism by an alignment configuration including at least one tapered post projecting forwardly from a back region of the base member for engagement with a recess on a back surface of the printer. The first surface of the base member may have at least one surface portion which is raised to reduce friction forces encountered when the printer is slid rearwardly into the docking station. The first surface of the base member may have a concave dished configuration adapted to mate with a convex printer bottom surface, the concave dished configuration causing the printer to self align with the docking station during docking. The base member may include at least one resilient structure, such as a pair of spaced rubber raised portions, which extends above the top surface of the housing and which is compressed as the printer is latched and docked. The first surface of the base member may have an electrical connector projecting therefrom with a tapered body adapted to guide the connector into a mating opening in a bottom wall of a printer during docking. The first surface of the base member may also have a slot to pass fanfold paper to the portable printer while the portable printer is docked.

In another embodiment of the present invention, a docking station for an electronic device is provided. The docking station includes a base member, and a latching mechanism positioned within the base member and operable to move from an engaging position to a non-engaging position. In the engaging position, the latching mechanism is capable of securing the electronic device to the base member. The docking station further includes a locking mechanism positioned within the base member. The locking mechanism is coupled to the latching mechanism and is operable to both lock the latching mechanism in the non-engaging position when the electronic device is undocked and to unlock the latching mechanism when the electronic device is docked.

Optionally, the latching mechanism includes a push button coupled to one or more latches, where the push button is operable to move the latches linearly from the engaging position to the non-engaging position. The latching mechanism may further include a tension spring. The tension spring is capable of biasing the latching mechanism linearly to the engaging position while the locking mechanism is unlocked. The docking station may also include an actuator operable to move the locking mechanism to lock and unlock the latching mechanism. Furthermore, the locking mechanism may include a lever coupled to the actuator and to a compression spring. The lever is advantageously operable to pivot between a locking position and an unlocking position in response to biasing of the compression spring. The locking position corresponds to the non-engaging position, and the actuator is capable of biasing the electronic device upwardly in the non-engaging position in response to biasing of the compression spring.

The first surface may generally include first and second ends, as well as lateral edges extending between the first and second ends. At least a portion of the lateral edges and the first and second ends may extend above the first surface to define a cradle, where the electronic device capable of being positioned within the cradle. The first surface of the base member may also generally include a first end sloping downwards towards a second end, which promotes draining of any liquids that may become entrapped within the docking station. The docking station may further include a recess defined in the second end and extending from a position located above the first surface to a position proximate to the first surface. One or more locators may be defined in the second end and are capable of engaging the electronic device while the electronic device is positioned within the cradle. A plurality of vents may also be defined in the lateral edges of the base member to provide cooling to the electronic device and base member.

In additional aspects of the docking station, the electronic device includes at least one docking connector defined in the base member, where the docking connector is operable to engage a corresponding connector on the electronic device in the engaging position. The docking connector is capable of being in electronic communication with the electronic device. The docking connector may be integrally formed with the base member and extend to a position located above the first surface of the base member to protect the docking connector from contaminants that may potentially become entrapped on the base member. Further, a raised surface may be defined in the first surface of the base member, which promotes sliding between the electronic device and the raised surface. One or more bumpers may be positioned on the first surface to provide pressure on a bottom surface of the electronic device while the latching mechanism is in the engaging position to further secure the electronic device within the docking station. In one embodiment of the present invention, the electronic device is a portable printer. Advantageously, a slot may be defined in the first surface for receiving a printable material, such as fan fold media, to accommodate the portable printer while the printer is docked in the docking station.

Another embodiment of the present invention includes a docking station for an electronic device. The docking station includes a base member having a first surface upon which the electronic device is capable of at least partially resting. The docking station also includes a latching mechanism positioned within the base member and operable to move from an engaging position to a non-engaging position. In the engaging position, the latching mechanism is capable of securing the electronic device to the base member. The docking station further includes a locking mechanism positioned within the base member. The locking mechanism is coupled to the latching mechanism and is operable to lock the latching mechanism in the non-engaging position. The docking station also includes an actuator operable to move the locking mechanism to lock and unlock the latching mechanism from the non-engaging position.

In an additional embodiment of the present invention, a docking station for an electronic device includes a cradle. The cradle includes a base member having a first surface upon which the electronic device is capable of at least partially resting. The cradle also includes first and second ends and lateral edges extending between the first and second ends. At least a portion of the lateral edges and the first and second ends extend upwardly to define the cradle. A drain, such as a hole, recess, or reservoir, is defined in the cradle, and the first surface slopes downwardly in a direction extending proximate to the drain. The docking station also includes a latching mechanism positioned within the base member and operable to move from an engaging position to a non-engaging position. The latching mechanism is capable of securing the electronic device to the first surface of the base member in the engaging position.

In further embodiments of the present invention, the docking station employs the cradle and latching mechanism similar to that described above, as well as a recess defined in the first end of the cradle, wherein the recess extends from the first end towards the second end to expose a portion of a bottom surface of the electronic device such that the electronic device is capable of being removed with one hand while the latching mechanism is in the non-engaging position. In the alternative to a recess defined in the cradle, the docking station may include a latching mechanism having one or more latches, and an actuator operable to lock and unlock the latches from the non-engaging position, the latches and actuator capable of biasing the electronic device upwardly in a non-engaging position.

In yet another embodiment of the present invention, a mobile service for performing transactions between a merchant and a consumer is provided. The mobile service includes a portable printer having a printhead, media drive, and media support. The portable printer is capable of completing a transaction between the merchant and the consumer. The mobile service also includes a portable docking station having a latching mechanism including one or more latches adapted to automatically engage and securely dock the portable printer on the docking station, wherein the portable printer is capable of performing the transaction while docked within the docking station.

The docking station of the present invention has many advantages. The docking station is easily transportable and is even transportable while the electronic device is docked within the docking station. As such, the docking station is fully functional and includes a docking connector and a peripheral connector to increase functionality. The docking station is sized and shaped to support the entire electronic device on the docking station to help prevent any dislodging and potential damage to the docking connector and corresponding connector on the electronic device. In this regard, the docking station is preferably a cradle that conforms to the electronic device when the electronic device is docked. The cradle aids in docking the electronic device, as the configuration of the cradle promotes self-alignment of the electronic device as the electronic device is positioned within the cradle for docking. The latching mechanism secures the electronic device to the docking station and also aids in preventing dislodging of the electronic device. Furthermore, the locking mechanism is coupled to the latching mechanism to facilitate efficient and user friendly docking and undocking of the electronic device. For instance, a push button may be used to disengage the latching mechanism such that an operator may dock and undock the electronic device with one hand.

Several features are included to improve both the user friendliness and the longevity of the docking station. For example, the docking station includes locators to aid in docking the electronic device, as well as a raised surface that promotes sliding between adjacent surfaces of the electronic device and docking station during docking and undocking. One or more bumpers located on the docking station provides a biasing force to firmly secure the electronic device to the docking station while the electronic device is docked. The docking station also includes a docking connector that is integral with, and raised above, the base of the docking station to prevent potential contaminants from entering the docking connector. Additionally, the base of the docking station is sloped towards a recess defined in the docking station that allows any inadvertently spilled liquids to drain off of the docking station. The docking station is advantageously useful for salespersons, wait staff, deliverers, and others that require a portable docking station for either charging an electronic device, such as a portable printer, exchanging data between the electronic device and peripheral devices, or simply as a storage device for securing the electronic device.

FIG. 1 shows a system 10 including a docking station 12 supporting an electronic device 14. The electronic device 14 is illustrated as a portable printer and the docking station 12 is sized and shaped with a docking tray to receive the portable printer. While not shown, the printer includes various components for printing on labels and other media. For example, the printer may include, among other things, a printhead, media drive, RFID encoder/reader, smart card, and media support. The electronic device 14 can be loaded or "docked" on the docking station 12 such that the electronic device is physically and electrically mated with the docking station, or removed or "undocked" from the docking station such that the electronic device is unconnected with the docking station.

Various aspects of the printer illustrated in FIG. 1 are described in greater detail in the following patent applications which have been filed concurrently herewith and are hereby incorporated herein in their entirety by reference, including:

U.S. Nonprovisional Application No. 11/192,973 to Horrocks, et al., filed on Jul. 29, 2004 and entitled SYSTEM AND METHOD FOR PROVIDING A PORTABLE PRINTER CAPABLE OF ALTERING THE ORIENTATION OF INFORMATION DISPLAY ON AN ASSOCIATED PRINTER DISPLAY;

U.S. Nonprovisional Application No. 11/190,632 to Klein, et al., filed on Jul. 29, 2004 and entitled INTERCHANGEABLE MODULE FOR A PORTABLE PRINTER AND SYSTEM FOR OPERATING THE SAME;

U.S. Nonprovisional Application No. 10/901,883 to Lyman, et al., filed on Jul. 29, 2004 and entitled PRINTER ASSEMBLY AND METHOD OF USING THE SAME;

U.S. Nonprovisional Application No. 10/901,718 to Beck, et al., filed on Jul. 29, 2004 and entitled UNIVERSAL CARD READER APPARATUS AND METHOD; and U.S. Nonprovisional Application No. 10/901,686 to Beck, et al., filed on Jul. 29, 2004 and entitled PRINTER CABLE AND ASSOCIATED STRAIN RELIEF COLLAR FOR CREATING A RUGGEDIZED CONNECTION FOR AN ELECTRICAL TERMINAL OF A PRINTER AND ASSOCIATED METHODS THEREFOR.

With regard to this disclosure, it is first important to note that the concepts and ideas embodied in the present invention are not limited to docking stations per se, but instead may be applied to any device where an electronic device may be docked. For instance, the electronic device may be implemented as a laptop computer, notebook computer, sub-notebook computer, hand-held computer, or other portable computing device, such as a portable printer. The docking station may be implemented as a full station, as a port replicator, or even a simple mounting or storage device, but is preferably configured as a "cradle." As used herein, the term "docking station" is intended to broadly apply to various forms of bases ranging from a sophisticated, full docking station having internal processing and electronic components, circuit board, cable interconnects, and a power supply unit, to an unsophisticated port replicator that simply provides a means to manage cable connections. Similarly, the term "cradle" is not meant to be limiting and may include any docking station that is capable of supporting and/or receiving an electronic device, as well as providing electronic communication between the electronic device and the docking station.

Figure 2:
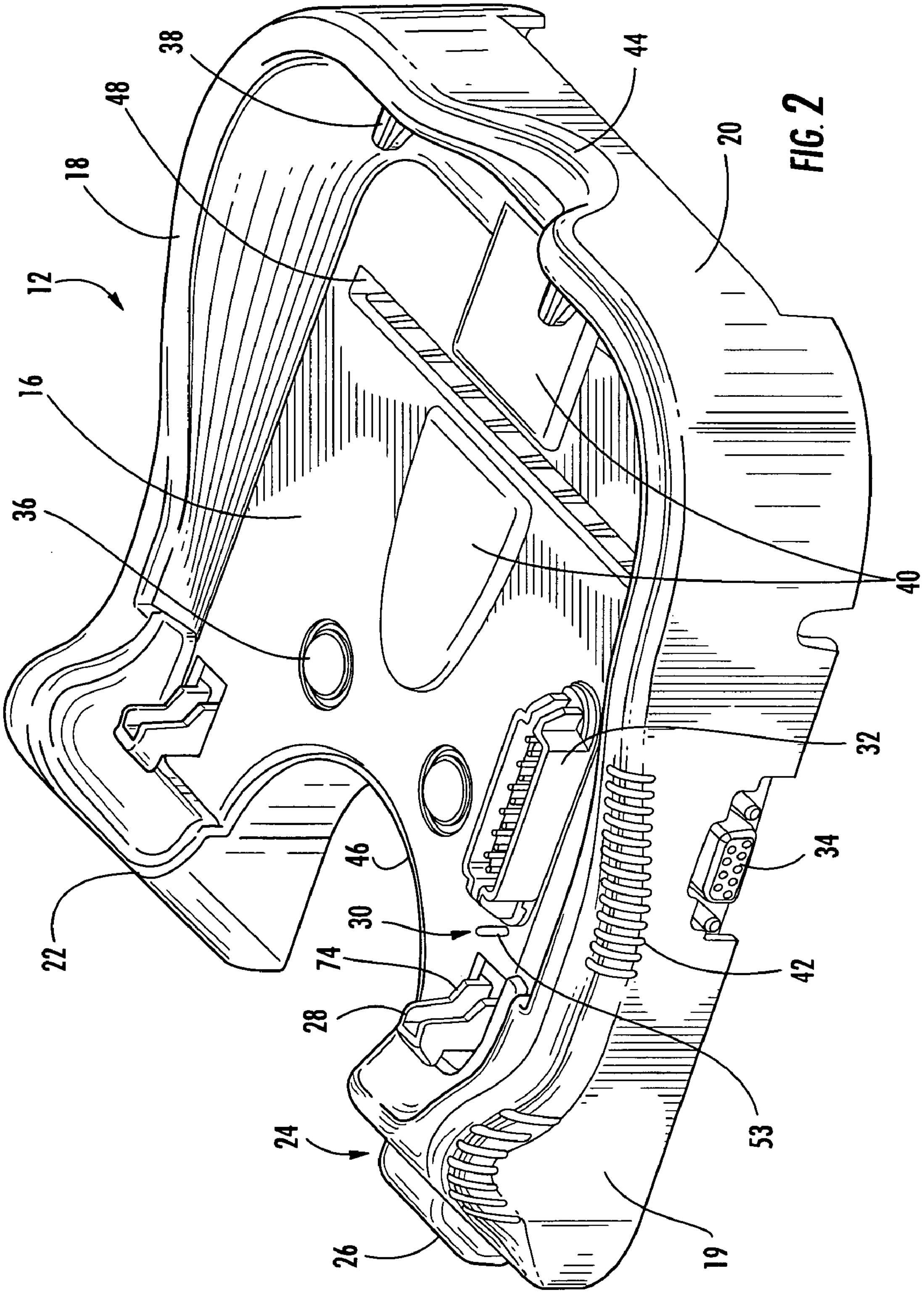
FIG. 2 is a perspective view of the docking station shown in FIG. 1.

FIG. 2 illustrates a docking station 12 according to one embodiment of the present invention. The docking station 12 includes a bottom surface 16, lateral edges 18, 19, a back edge 20, and a front edge 22 extending between the lateral edges. Each of the lateral edges 18, 19, as well as the back 20 and front 22 edges preferably include a raised edge extending above the bottom surface 16 to define a cradle, as shown in FIGS. 2, and 4-7. Thus, an electronic device 14 positioned within the docking station 12 rests at least partially on the bottom surface 16 while being supported by the raised edges of the lateral edges 18, 19 and back 20 and front 22 edges. As such, the electronic device 14 is securely positioned and self-aligned within the docking station 12, and the docking station may be any desired shape or size to conform to a variety of electronic devices. Furthermore, unless otherwise specified herein, the various features of the docking station 12 are preferably a lightweight but durable polymeric material such as polycarbonate, such that the docking station and its components may be molded in a variety of configurations and sizes.

The docking station 12 also includes a latching mechanism 24 that moves between engaging and non-engaging positions. Generally, in the engaging position, the electronic device 14 is secured to the bottom surface 16 of the docking station 12, while in the non-engaging position, the electronic device may be readily removed from the docking station. As will be discussed in greater detail below, the latching mechanism 24 generally includes a push button 26, or similar actuator, that actuates one or more latches 28 that move between the engaging and non-engaging positions. As will also be explained more fully below, the latching mechanism 24 operates in conjunction with a locking mechanism 30. The locking mechanism 30 locks the latches 28 in the non-engaging position, and also releases the latches to allow the latches to move to the engaging position.

Figure 12:
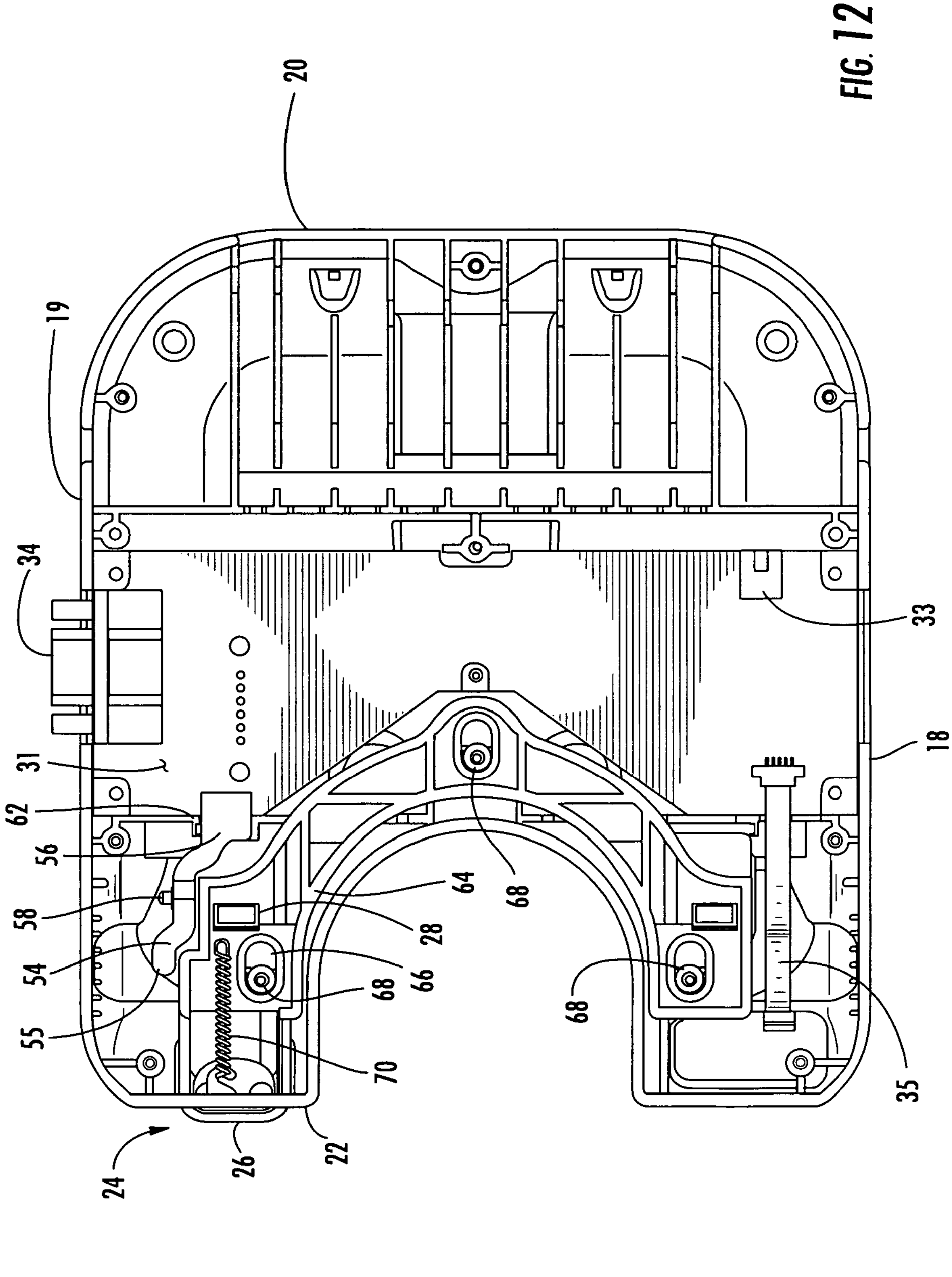
FIG. 12 is a plan and cross-sectional view of the bottom of the docking station shown in FIG. 2, illustrating the latching mechanism.

FIG. 12 illustrates that the docking station 12 includes a circuit board 31. The circuit board 31 is compatible with a docking connector 32, shown in FIG. 2, and extends through the bottom surface 16 of the docking station 12 and connects to the circuit board. The docking connector 32 is compatible with a corresponding connector located on the electronic device 14. When the electronic device 14 is positioned on the bottom surface 16 of the docking station 12, the connector on the electronic device mates with the docking connector 32 on the docking station such that the electronic device and docking station are in electronic communication with one another. The docking connector 32 could be any suitable connector compatible with electrical devices 14 and capable of exchanging data or power, as known to those skilled in the art. Thus, power may be supplied through a power connector 33 to charge the electronic device 14 while the electronic device is docked within the docking station 12. Typically a single docking connector 32 is provided, although it is appreciated that more than one docking connector may be included in additional embodiments of the present invention. Furthermore, it is appreciated that the docking connector 32 may not be required in embodiments where a contactless battery is employed to recharge the electronic device 14, or when the docking station 12 is used solely as a mounting device such that there are no electrical connections between the electronic device and the docking station.

FIG. 2 demonstrates that the docking connector 32 includes a protective cover that is integral with the bottom surface 16 of the docking station 12 and extends above the bottom surface. Thus, the docking connector 32 not only protects the electrical connectors contained within the docking connector from physical damage, but also protects the electrical connectors from contamination, such as liquids that are inadvertently spilled within the docking station 12. Further, the docking connector 32 also provides final alignment of the electronic device 14 within the docking station 12. In addition, the docking connector 32 preferably includes electrical connectors having a pin located nearest to the actuator 53 that detects when the electronic device 14 is fully engaged within the docking station 12. This pin, which could be a similar switch positioned on the bottom surface 16, ensures that there is full communication between the electrical connectors and the electronic device 14 prior to charging or exchanging data, as this could potentially lead to damage to the electrical components of the docking station 12. Although the docking connector 32 is shown as integral and extending above the bottom surface 16 of the docking station, the docking connector could be a separate component attached, molded, or otherwise secured to the bottom surface or located at various heights above the bottom surface.

Figure 5:
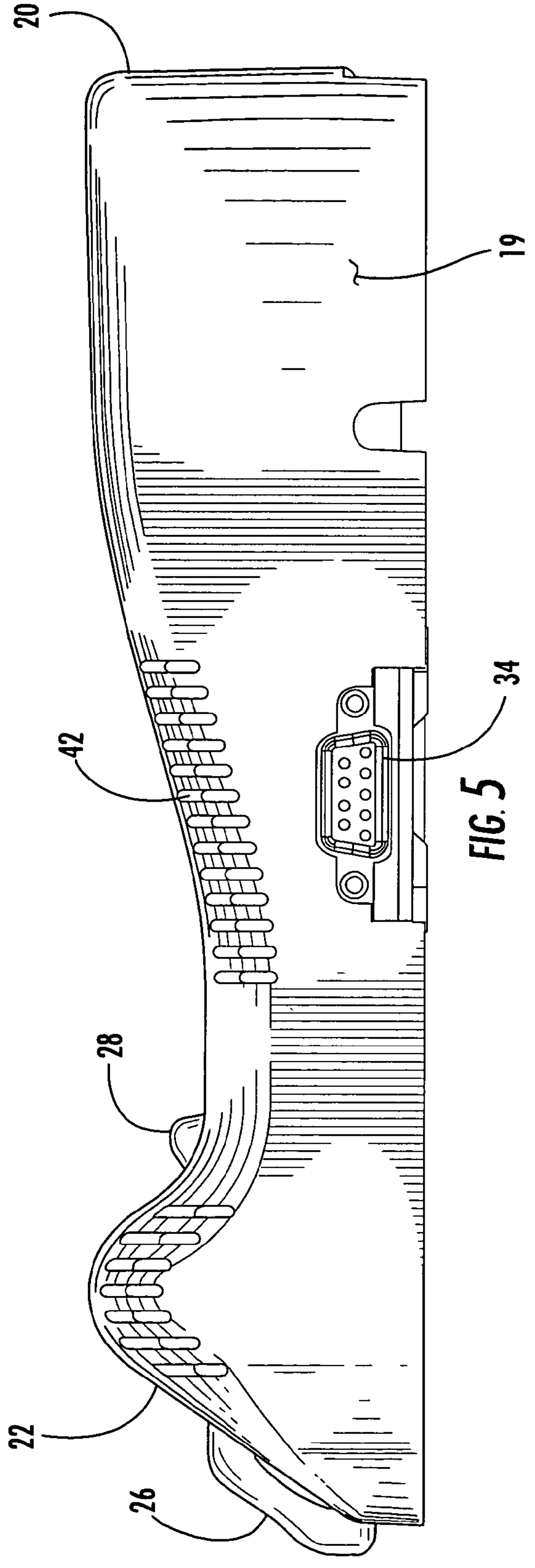
FIG. 5 is a side elevation view of the docking station shown in FIG. 2.

FIGS. 5 and 12 illustrate that the docking station 12 also includes a peripheral connector 34 that attaches to the circuit board 31. The peripheral connector 34 is compatible with a peripheral device that allows the peripheral device to communicate with the electronic device 14. As such, the peripheral connector 34 is electrically coupled to the docking connector 32 to facilitate communication between the peripheral device and the electronic device 14. There could be any number of peripheral connectors 34 provided on the docking station 12, where each peripheral connector could include one or more ports, such as a serial, parallel, Ethernet, USB, or other port known to those skilled in the art. Similarly, the peripheral device could be any suitable peripheral device compatible with the peripheral connector 34 and electronic device 14, such as a power supply, printer, external memory, or any other device known to those skilled in the art.

Figure 4:
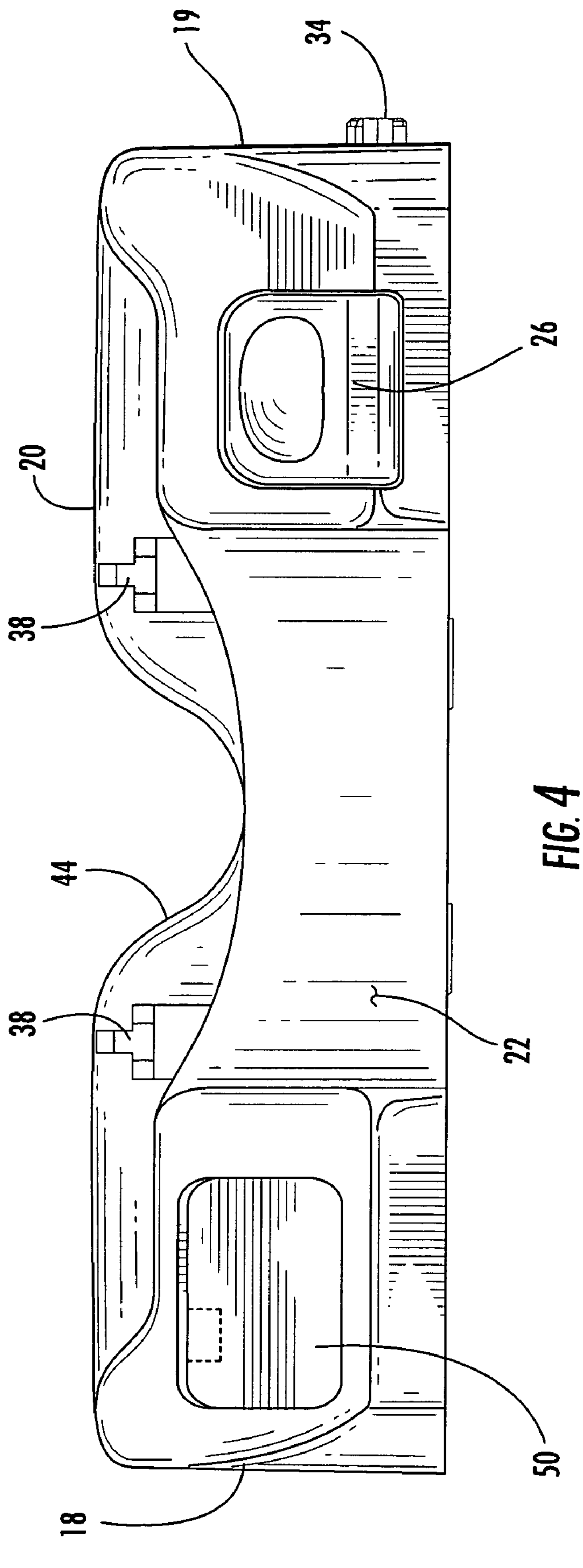
FIG. 4 is a front elevation view of the docking station shown in FIG. 2.

The docking station 12 includes an LED 50 that is connected to the circuit board 31 with a flex circuit 35, as shown in FIGS. 4 and 12. A flex circuit, as known to those skilled in the art, is a printed circuit made of a thin, flexible material. In the alternative, cables or other interconnects may be used to connect the LED 50 to the circuit board 31. The LED 50 could include any number of indicators that provide a visual signal, such as a signal indicating that the electronic device 14 is charging or is fully charged, or that data is transferring or has been transferred between the electronic device and a peripheral device. Although an LED 50 is depicted, it is understood that the docking station 12 could include other indicators, such as an audible signal to aid an operator.

Figure 8:
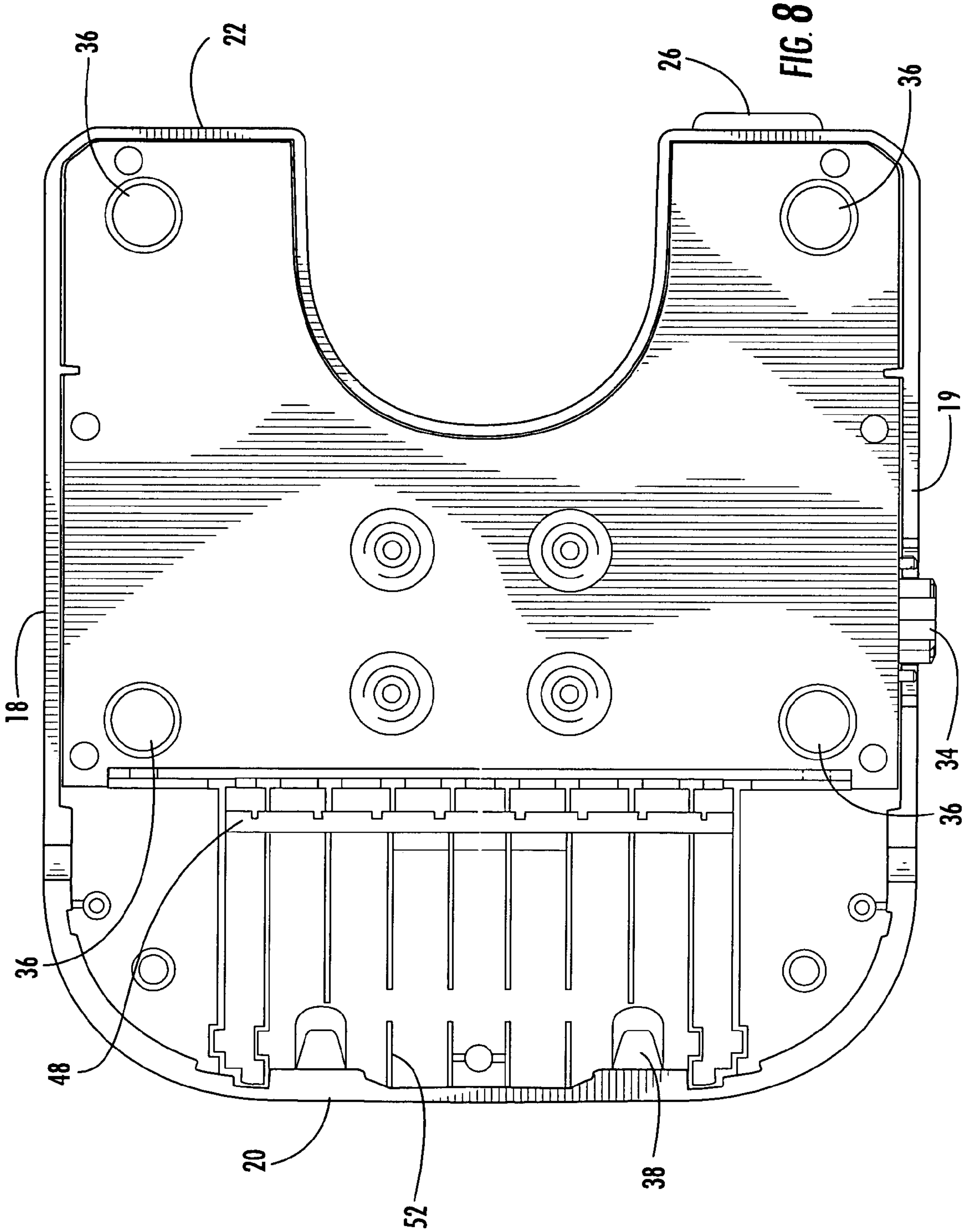
FIG. 8 is a plan view of a bottom surface of the docking station shown in FIG. 2.

The docking station 12 according to one embodiment of the present invention includes several optional features that aid in docking and undocking the electronic device 14, as well as increasing the functionality of the docking station. For example, the docking station 12 includes one or more bumpers 36, shown in FIGS. 2-3 positioned on the bottom surface 16 of the docking station. The bumpers 36 are typically a high friction material, such as rubber, that provide a biasing force on the bottom surface of the electronic device 14 when the electronic device is positioned in an engaging position in the docking station. Therefore, the bumpers 36 provide an upward force on the bottom surface 16 of the electronic device 14 when the electronic device is secured in the engaging position, which promotes greater fixation while in the engaging position to limit the potential for dislodging the electronic device. As shown in FIG. 8, the bottom of the docking station 12 may also include several bumpers 36 to provide traction on a variety of surfaces during docking and undocking.

Figure 3:
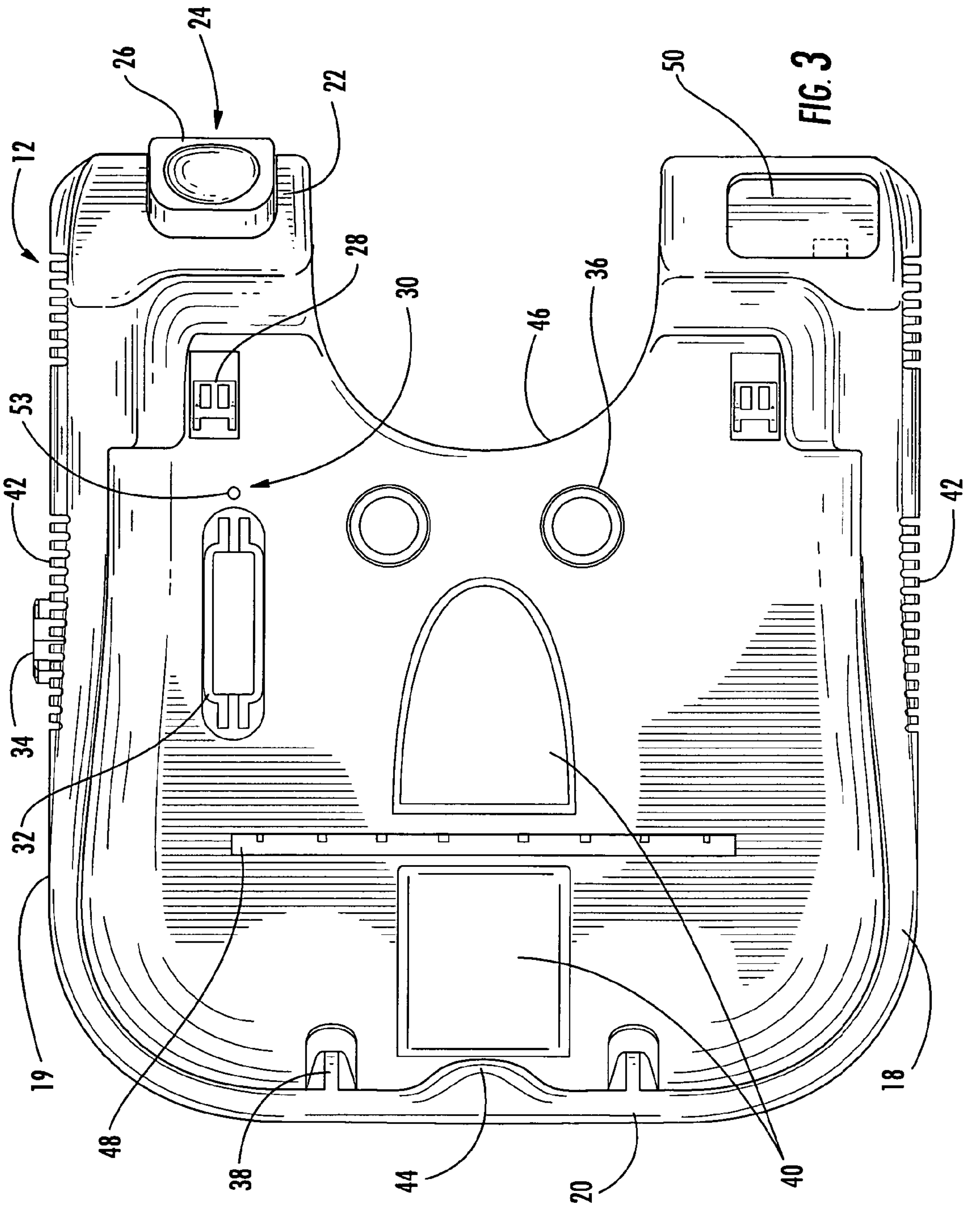
FIG. 3 is a plan view of the docking station shown in FIG. 2.

In order to aid in docking the electronic device 14 within the docking station 12, the docking station includes one or more locators 38 defined in the back edge 20 of the docking station, as shown in FIGS. 3-4. Each of the locators 38 extends from the back edge 20 of the docking station 12. The electronic device 14 typically includes one or more corresponding receptacles that engage the locators 38 to locate one end of the electronic device 14 within the docking station 12. The locators 38 also prevent the end of the electronic device 14 adjacent to the back edge 20 of the docking station 12 from moving vertically when engaged within the docking station. In an alternative embodiment, the electronic device 14 may include one or more locators 38, in which case, the back edge 20 would include receptacles for receiving the locators. Further, in other embodiments, the docking station 12 could include rails on the inner surface of lateral edges 18 and 19 that are inserted in grooves in the electronic device or visa versa.

Figure 9:
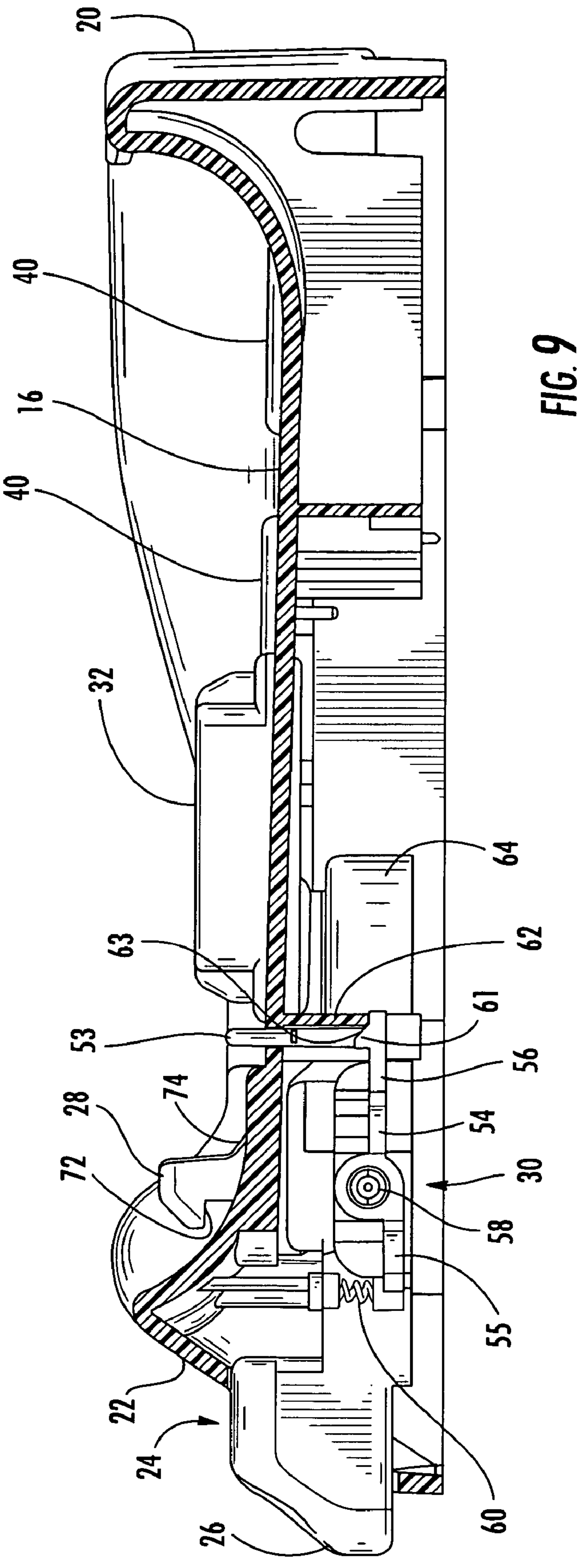
FIG. 9 is a side elevation and cross-sectional view of the docking station shown in FIG. 2, according to one embodiment of the present invention.

The docking station 12 also includes a raised surface 40 extending above the bottom surface 16 of the docking station. The raised surface 40 extends slightly above the bottom surface 16 and may be broken into segments if a media slot 48 is provided in the cradle, as shown in FIGS. 3 and 9. The raised surface 40 provides a low friction sliding surface that promotes sliding when a first end of the electronic device 14 is initially positioned within the docking station 12 such that the electronic device slides and engages the locators 38. Thus, when docking the electronic device 14, a bottom portion of the electronic device first contacts the raised surface 40 to allow the electronic device to slide into engagement with the locators 38. In this regard, a portion of the bottom surface of the electronic device 14 preferably includes a corresponding low friction surface that contacts the raised surface 40 during docking and undocking the electronic device.

Figure 6:
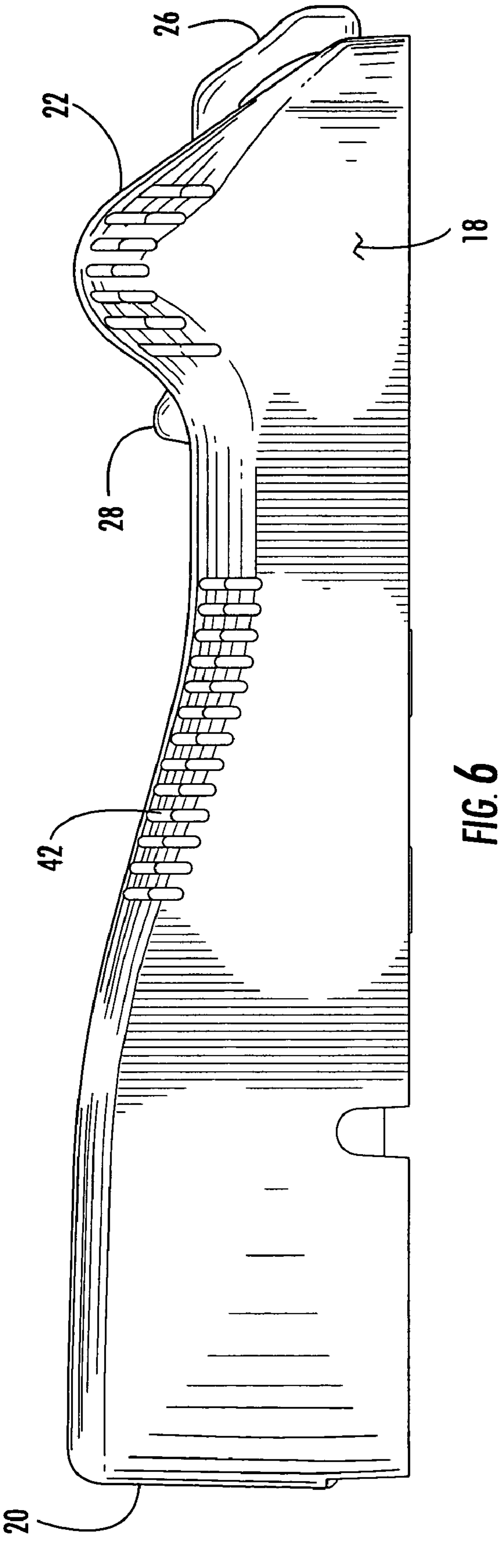
FIG. 6 is another side elevation view of the docking station shown in FIG. 2.
Figure 7:
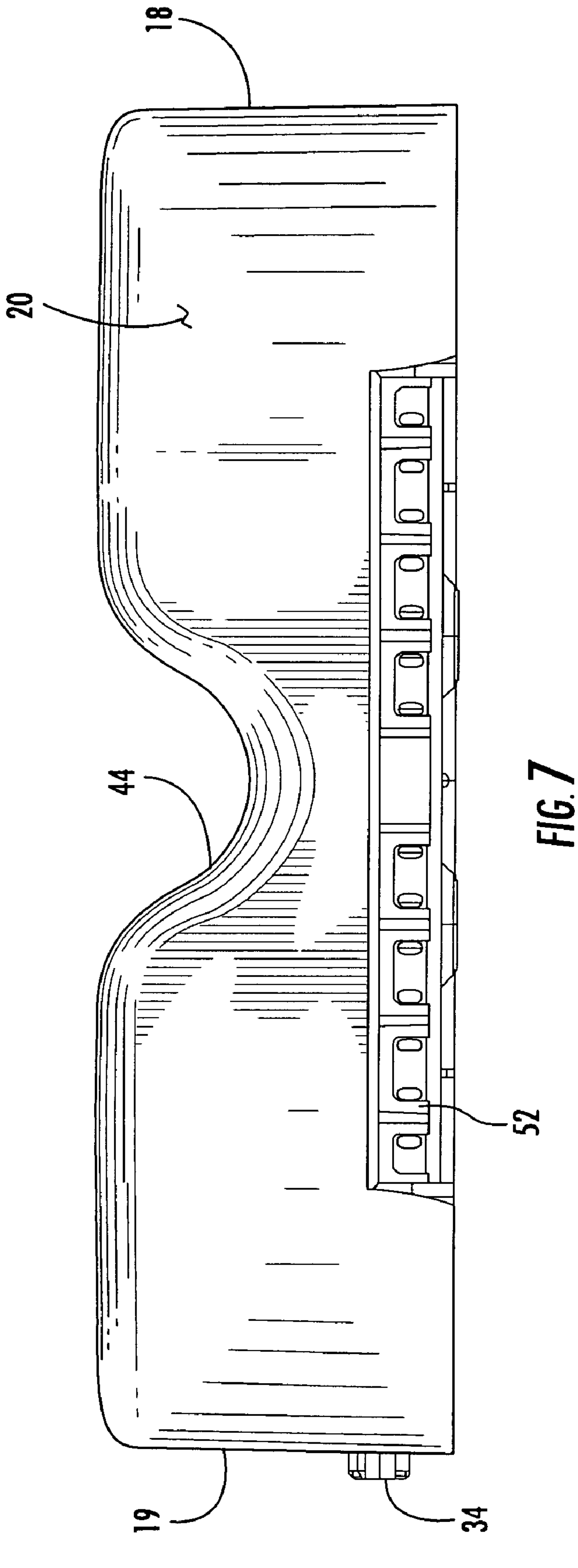
FIG. 7 is a rear elevation view of the docking station shown in FIG. 2.

FIGS. 3 and 5-6 illustrate that vents 42 are provided in the lateral edges 18, 19 of the docking station 12 to promote cooling while the electronic device 14 is docked within the docking station. The docking station 12 may also include fins 52 defined in the bottom of the docking station that is not in contact with the electronic device 14, as shown in FIGS. 7-8. Thus, the fins 52 increase the stiffness of the docking station 12, and also provide a guide for media, such as fanfold media.

The docking station 12 also typically includes rear 44 and front 46 recesses. The rear recess 44 extends substantially from the top of the back edge 20 to the bottom surface 16 of the docking station 12, as shown in FIG. 2. The cross-sectional view shown in FIG. 9 illustrates that the bottom surface 16 of the docking station 12 slopes downwardly from the front edge 22 to the rear edge 20. Therefore, the rear recess 44 advantageously provides a mechanism to drain any potential liquids that could become entrapped within the docking station 12. It may also be used to remove dirt or other debris from the cradle. In alternative embodiments, a hole or reservoir may be provided in the bottom surface 16 of the docking station.

Figure 14:
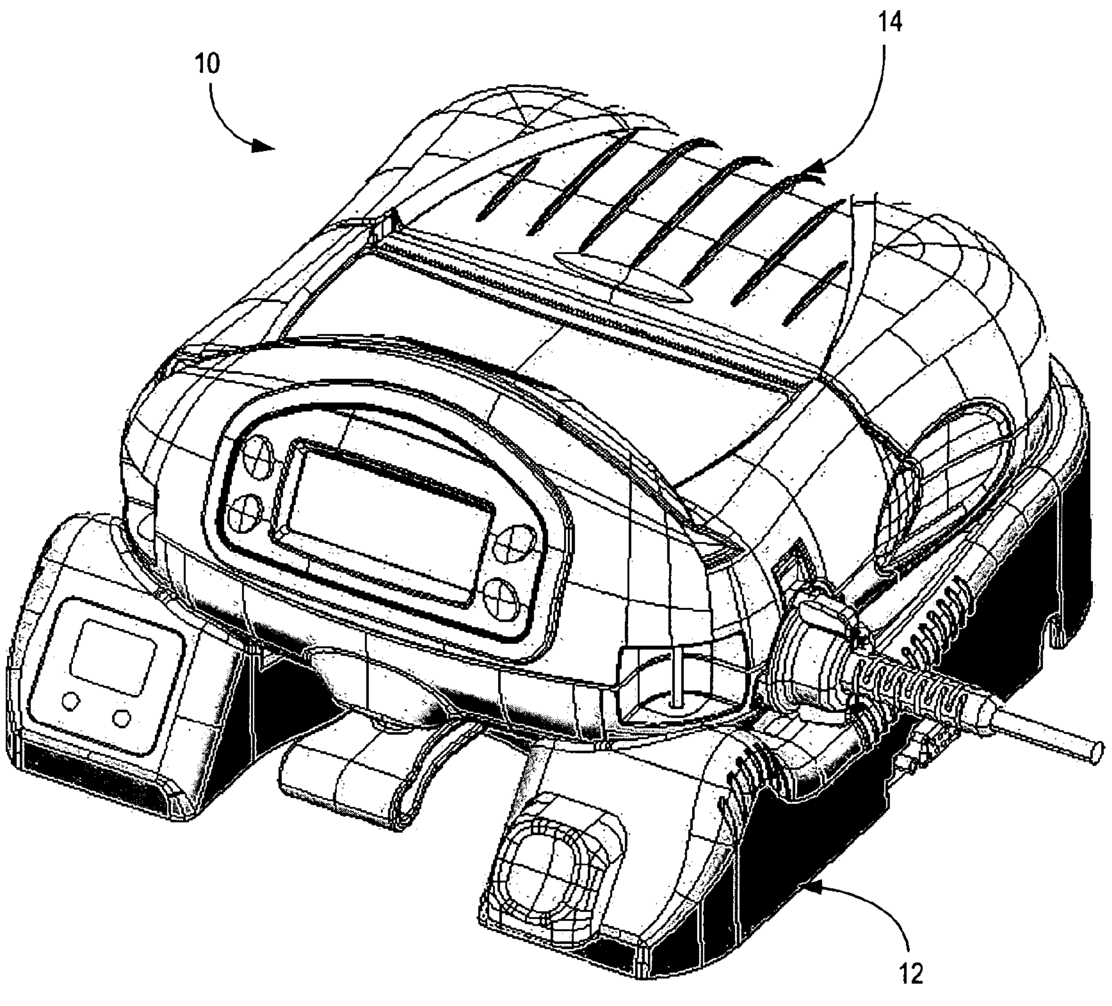
FIG. 14 is a perspective view of a system illustrating the self-aligning configuration of the electronic device and docking station while docked according to one embodiment of the present invention.

The front recess 46 provides a curvature that conforms to the electronic device 14 that aids in centering the electronic device in the docking station 12 during docking and undocking, and the front recess extends from the front edge 22 towards the back edge 20 to expose a bottom portion of the electronic device when docked within the docking station, which also allows an operator to easily place his or her hand under the electronic device to lift the electronic device from the docking station when the electronic device is in a non-engaging position. Furthermore, as shown in FIG. 14, the electronic device 14 may include a concave curvature that mates with the convex curvature of the docking station 12, which promotes self-alignment of the electronic device when docked. As such, the self-alignment contour of the docking station 12 and access to the electronic device 14 provided by the front recess 46 promotes user-friendly docking and undocking of the electronic device.

In embodiments where a portable printer or similar electronic device requiring printable material (e.g., fanfold media) is used, the docking station 12 includes a slot 48 (FIG. 3). The slot 48 receives the printable material such that the material may be fed through the slot and into the portable printer. Thus, as shown in FIG. 1, in the embodiment where the portable printer is docked within the docking station 12, the portable printer is fully functional and portable while engaged with the docking station. Furthermore, FIG. 1 illustrates that the media may be changed while the electronic device 14 is docked within the docking station 12.

The illustrated docking station 12 should not be limited to the depicted embodiments, as various aspects of the docking station may be employed in additional embodiments of the present invention. Many of the features of the docking station 12, such as the bumpers 36, locators 38, raised surface 40, vents 42, rear 44 and front 46 surfaces, and slot 48, are optional and may be used in various combinations or configurations. For example, although a pair of bumpers 36 and locators 38 are shown, it is understood that any number and size of bumpers and locators may be used in any desired location to aid in securing and locating the electronic device 14 on the docking station 12. The raised surface 40 may be broken into two or more segments, rather than only two segments as shown in FIGS. 3 and 9, but it is understood that the raised portion could also be a continuous surface. The bumpers 36 could also be any suitable material or configuration to bias the bottom surface of the electronic device 14 when docked within the docking station, which reduces the amount of vibration and potential damage to the electrical connectors in the docking connector 32 and electronic device. For example, the bumpers 36 could be spring plungers or a foam having various shapes and sizes. Furthermore, the vents 42 could be any size and configuration and located on any desired location of the docking station 12. The front recess 46 could also be any desired shape to conform to a particular electronic device 14.

Figure 10:
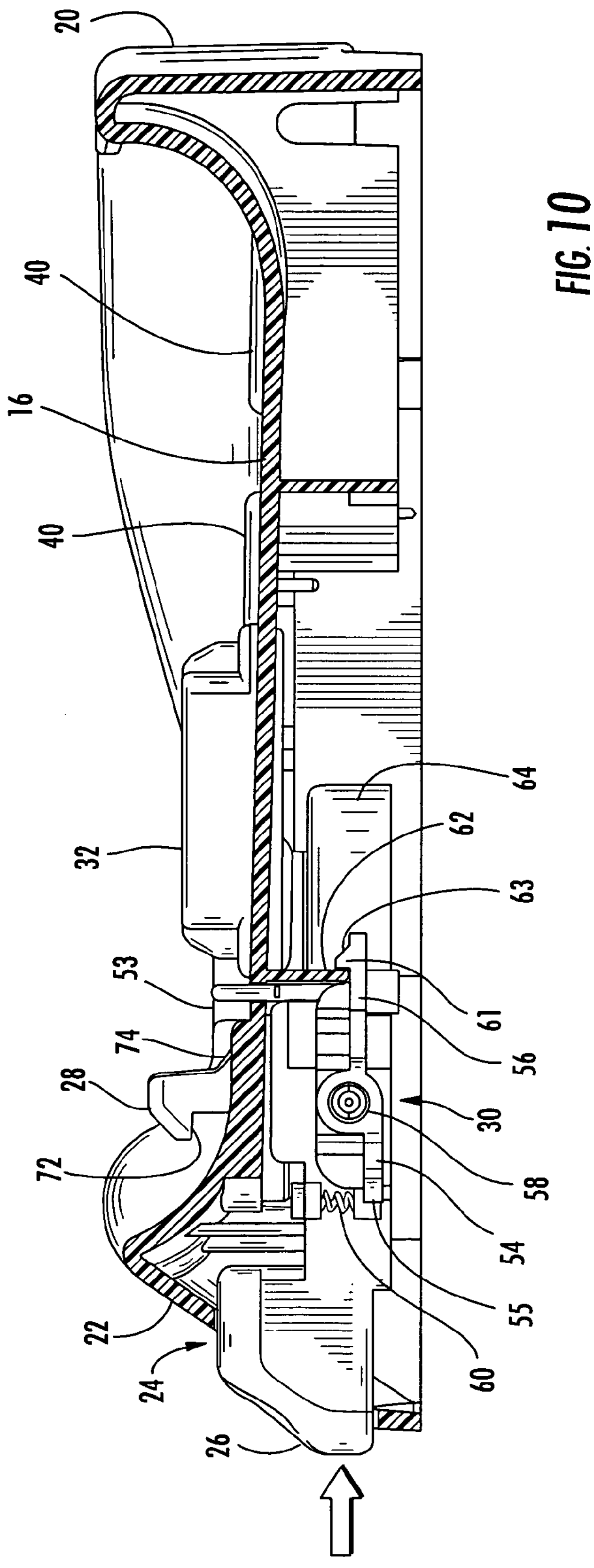
FIG. 10 is another cross-sectional view of the docking station shown in FIG. 2 illustrating a latching mechanism in a non-engaging position, according to one embodiment of the present invention.
Figure 11:
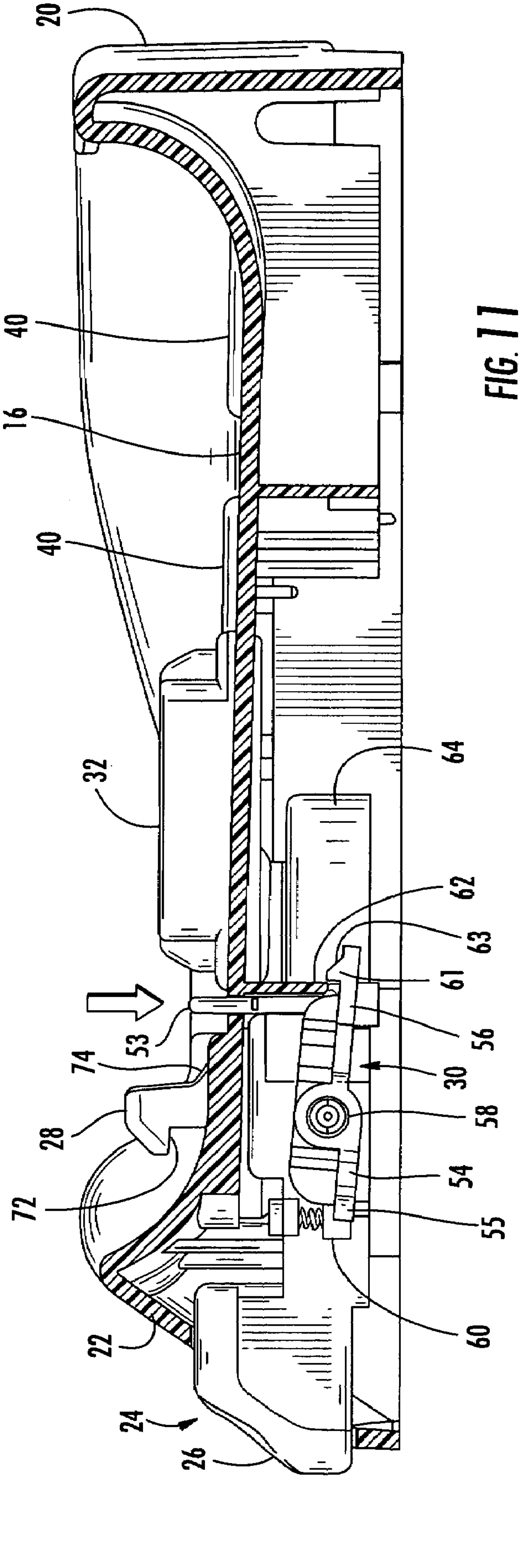
FIG. 11 is yet another cross-sectional view of the docking station shown in FIG. 2 demonstrating an actuator in a depressed position, according to one embodiment of the present invention.

The latching mechanism 24 and locking mechanism 30 are illustrated in detail in FIGS. 9-12. The locking mechanism 30 includes a lever 54 having a first end 55 and a second end 56, where the lever rotates about a pivot 58. The second end 56 of the lever is coupled to an actuator 53, where the actuator may extend above the bottom surface 16 of the docking station 12, as shown in FIG. 2. The first end 55 of the lever 54 is coupled to a compression spring 60. As the lever 54 rotates about the pivot 58, the first end 55 also rotates to either cause the compression spring 60 to expand or be further compressed. For example, as shown in FIG. 11, as the actuator 53 is depressed downwardly through the bottom surface 16, the second end 56 of the lever 54 is forced in a clockwise direction. Rotating the second end 56 clockwise about the pivot 58 also causes the first end 55 of the lever 54 to rotate clockwise to further compress the compression spring 60. Similarly rotating the second end 56 counterclockwise about the pivot 58 allows the compression spring 60 to relax and pushes the first end 55 counterclockwise until the second end contacts a bottom surface of a lock 62, as shown in FIG. 9.

The actuator 53 moves upwardly in response to the compression spring 60. Thus, when the locking mechanism 30 is unlocked, the actuator is urged upwards as the compression spring relaxes and pushes the lever 54 counterclockwise. The spring constant of the compression spring 60 generates sufficient force to overcome the weight of the electronic device 14 to bias the electronic device upwards from the bottom surface 16 of the docking station 12 when the electronic device is in a non-engaging position. Although the actuator 53 is described as being coupled to the locking mechanism, the actuator is preferably limited to vertical movement through the bottom surface 16 of the docking station 12 such that one end of the actuator may rest on a portion of the lever 54 or may be connected to the lever with a linkage or other mechanism. The actuator 53 is preferably metallic, although it is understood that the actuator could be a durable polymeric or composite material capable of withstanding biasing on the electronic device 14.

Although the actuator 53 is illustrated as a pin extending through the bottom surface 16 of the docking station 12, it is understood that the actuator is not limited to such a configuration. For example, the actuator 53 could be any size or configuration capable of biasing the electronic device 14 and lever 54. Furthermore, the actuator 53 could extend from the bottom surface 16 of the electronic device 14, rather than from the bottom surface 16 of the docking station, such that the actuator could be inserted through an opening defined in the bottom surface of the docking station to bias the lever 54 when the electronic device is raised and lowered in the docking station. In addition, the actuator 53 could also be positioned below the bottom surface 16 of the docking station 12, where a portion of the bottom surface proximate to the actuator is capable of biasing the actuator. Thus, the electronic device 14 may include a protrusion that extends from the bottom surface of the electronic device and is capable of biasing the actuator 53 upon contacting the protrusion on the bottom surface 16 of the docking station 12 proximate to the actuator.

The locking mechanism 30 further includes a hook 61 extending from the second end 56. The hook 61 is capable of engaging the lock 62 when the first 55 and second 56 ends of the locking mechanism 30 are approximately horizontal within the docking station 12, as shown in FIG. 10. The hook 61 also includes an angled surface 63 that may slide along a bottom surface of the lock 62. For example, as shown in FIG. 9, the angled surface of the hook 61 is located adjacent to the lock 62, and may slide along the bottom surface of the lock when urged in a direction extending from the front edge 22 towards the back edge 20. The combination of the sliding movement of the lever 54 and rotation about the pivot 58 allows the hook 61 to slide and rotate to engage the lock 62.

The latching mechanism 24 includes one or more latches 28 attached to a coupling 64, as shown in FIG. 12. Engaging dowels 68, which could be screw bosses, extend from the underside of the docking station 12 and within respective slots 66 defined in the coupling 64. The coupling 64 and latches 28 are restricted to linear movement by the engaging dowels 68 within the slot 66, as the engaging dowels are stationary. The push button 26 is attached to, or is integral with, the coupling 64, and a tension spring 70 attaches to the coupling at one end and to an interior surface of the front edge 22 on its opposite end. The tension spring 70 has a spring constant that is sufficient to pull the latches 28 from the non-engaging position to the engaging position when unlocked by the locking mechanism 30. As also demonstrated in FIG. 12, the locking mechanism 30 is attached to the coupling 64 such that linear movement of the coupling also causes linear movement of the lever 54. Each of the latches 28 defines a clasping surface 72 that engages the electronic device 14 when the latches are moved to the engaging position. As briefly described above, providing linear movement of the lever 54 in a direction extending from the front edge 22 towards the back edge 20 also causes the angled surface 63 of the hook 61 to slide and eventually engage the lock 62. In addition, each of the latches 28 typically includes an angled portion 74 opposite that of the clasping surface 72 and proximate to the bottom surface 16 of the docking station that is capable of partially elevating the electronic device 14 as the latches are moved in a direction extending from the front edge 22 towards the back edge 20.

The latching mechanism 24 and locking mechanism 30 illustrated are not meant to be limiting, and it is understood that various aspects of the latching and locking mechanisms may be modified in additional embodiments of the present invention. For example, in some embodiments of the present invention, the actuator 53 is capable of biasing the electronic device 14 upwards above at least a portion of the bottom surface 16 of the docking station 12 in response to biasing of the compression spring 60. Alternatively, the latches 28 can act concurrently with the actuator 53 to partially elevate a portion of the electronic device 14 off of the bottom surface 16 of the docking station. Thus, the angled portion 74 of the latches 28 may also bias the electronic device 14 upwardly as the latches move linearly from the engaging position to the non-engaging position. Furthermore, although a compression 60 and tension spring 70 are shown, it is understood that other mechanisms may be used to move the latching 24 and locking 30 mechanism, such as with pistons. In addition, it is understood that the latching 24 and locking 30 mechanisms may be sized and configured for accommodating various docking stations 12. Similarly, any number of latching 24 and/or locking 30 mechanisms, and their respective components, may be included with the docking station 12, where each component could be located in any desired location within or on the docking station.

Figure 13:
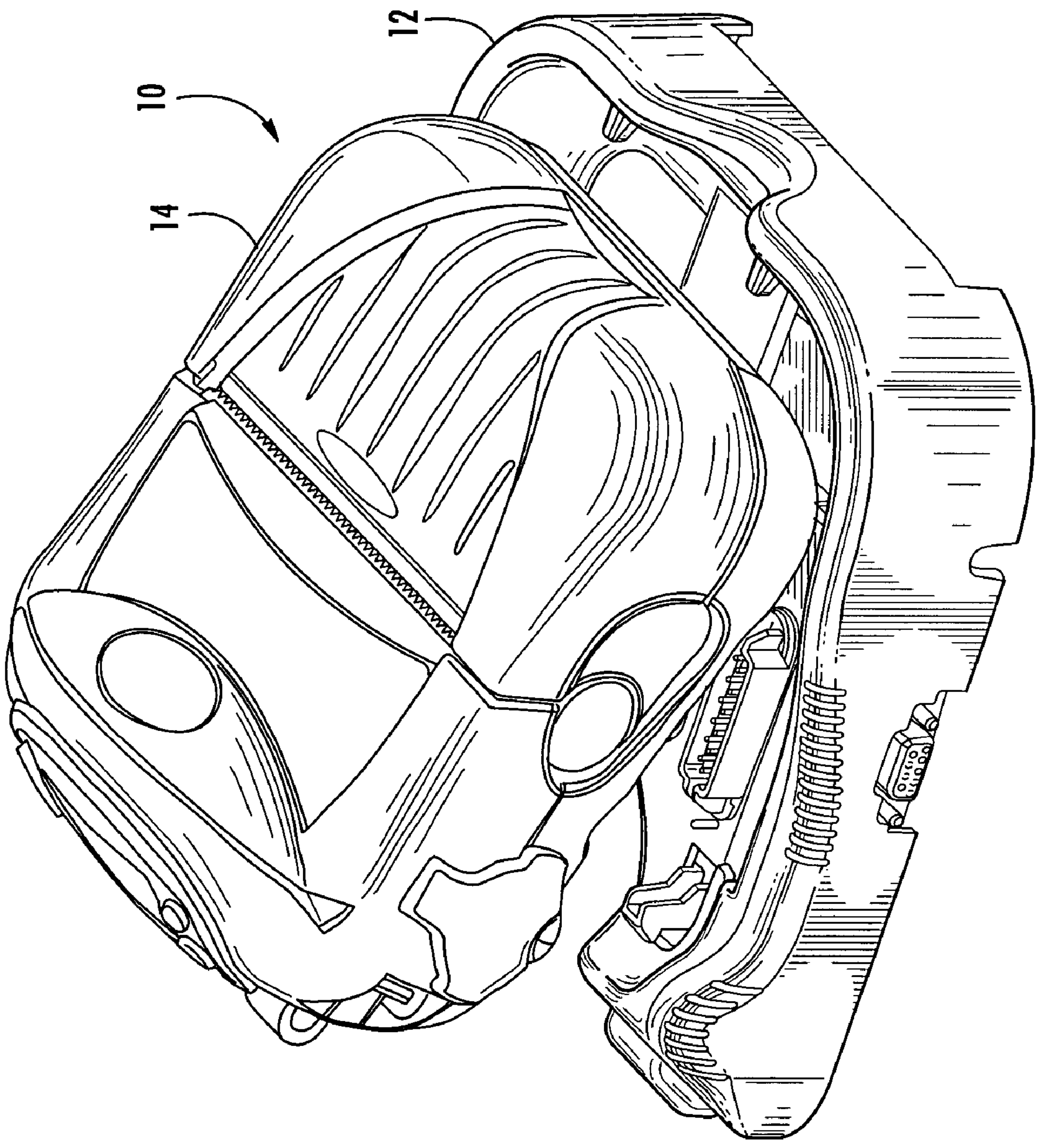
FIG. 13 is a perspective view of the system shown in FIG. 1 illustrating the electronic device partially docked within the docking station.

To dock the electronic device 14, the docking station 12 is typically placed on a horizontal surface, and a first end of the electronic device is positioned within the docking station, as shown in FIG. 13, such that the electronic device engages the locators 38. The docking station 12 could also be positioned in various other positions, such as on a dashboard of a car, or even vertically as a mounting device. As a free end of the electronic device 14 is moved downwardly typically by an operator pushing down on the free end, the bottom surface of the electronic device contacts the actuator 53. The downward force is required to overcome the biasing force provided by the compression spring 60 through the lever 54 and to the actuator 53. As the electronic device 14 is moved downwardly, the latches 28 also enter openings defined in the bottom surface of the electronic device in a non-engaging position. Following contact of the electronic device 14 on the actuator 53, further movement of the electronic device biases the actuator downwardly (shown by the directional arrow in FIG. 11) on the second end 56 of the lever 54 to cause clockwise rotation until the hook 61 disengages the lock 62. When the hook 61 is disengaged, the tension spring 70 pulls the coupling 64 linearly in a direction extending from the back edge 20 towards the front edge 22 of the docking station 12. Linear movement of the coupling 64 also causes the lever 54 to move in the same linear direction such that the hook 61 is moved past the bottom surface of the lock 62 and is incapable of engaging the lock. Linear movement of the coupling 64 forces the latches 28 to move linearly from the non-engaging position into an engaging position with the electronic device 14. In the engaging position, the electronic device 14 is secured to the docking station 12 by the clasping surface 72 and may not be removed from the docking station without actuating the button 26. During docking of the electronic device 14, the connector on the electronic device mates with the docking connector 32 on the docking station 12 such that the electronic device and docking station are in electronic communication with one another.

To undock the electronic device 14 from the docking station 12, an operator pushes the button 26 in a direction extending from the front edge 22 towards the back edge 20, as illustrated by the directional arrow shown in FIG. 10, which causes the latches 28, lever 54, and coupling 64 to also move in the same linear direction. The coupling 64 is moved to a predetermined position and the engaging dowels 68 restrict the amount of linear movement of the latches 28, lever 54, and coupling 64, which prevents the latches 28 from moving into binding engagement with the electronic device 14. The latches 28 are moved in a direction extending from the front edge 22 towards the back edge 20 until the clasping surface 72 of the latches no longer engage the electronic device 14. Consequently, the compression spring 60 is free to push actuator 53 upwardly on the bottom surface of the electronic device 14, which biases the electronic device upwardly into a non-engaging position. Furthermore, the linear movement of the lever 54 causes the angled surface 63 of the hook 61 to move along a bottom surface of the lock 62. Eventually the angled surface 63 of the hook 61 slides past the bottom surface of the lock 62, and the compression spring 60 causes the hook to rotate counterclockwise to lock the lever 54 into engagement with the lock, as shown in FIG. 10. The compression spring 60 biases the first end 55 of the lever 54 in a counterclockwise direction, which causes the second end 56 of the lever to contact a bottom surface of the lock 62 in a resting position. In the non-engaging position, the electronic device 14 is slightly elevated by the actuator 53 and/or latches 28, which allows the operator to easily remove the electronic device from the docking station 12.

The docking station 12 of the present invention has many advantages. The docking station 12 is easily transportable and is even transportable while the electronic device 14 is docked within the docking station. As such, the docking station 14 is fully functional and includes a docking connector 32 and peripheral connector(s) 34 to increase functionality. The docking station 12 is sized and shaped to support the entire electronic device 14 on the docking station to help prevent any dislodging and potential damage to the docking connector 32 and corresponding connector on the electronic device. In this regard, the docking station 12 is preferably a cradle that conforms to the electronic device 14 when the electronic device is docked. The cradle aids in docking the electronic device 14, as the configuration of the cradle promotes self-alignment of the electronic device as the electronic device is positioned within the cradle for docking. The latching mechanism 24 secures the electronic device 14 to the docking station 12 and also aids in preventing dislodging of the electronic device. Furthermore, the locking mechanism 30 is coupled to the latching mechanism 24 to facilitate efficient and user friendly docking and undocking of the electronic device 14. For instance, a button 26 may be pushed to disengage the latching mechanism 24 such that an operator may dock and undock the electronic device 14 with one hand.

Several features are included to improve both the user friendliness and the longevity of the docking station 12. For example, the docking station 12 includes locators 38 to aid in docking the electronic device 14, as well as a raised surface 40 that promotes sliding between adjacent surfaces of the electronic device and docking station during docking and undocking. One or more bumpers 36 located on the docking station 12 provides a biasing force to firmly secure the electronic device 14 to the docking station while the electronic device is docked. The docking station 12 also includes a docking connector 32 that is integral with, and raised above, the bottom surface 16 of the docking station to prevent potential contaminants from entering the docking connector. Additionally, the bottom surface 16 of the docking station 12 is sloped towards a rear recess 44 defined in the docking station that allows any inadvertently spilled liquids to drain off of the docking station. The docking station is advantageously useful for salespersons, wait staff, deliverers, and others that require a portable docking station for either charging an electronic device, such as a portable printer, exchanging data between the electronic device and peripheral devices, or simply as a storage device for securing the electronic device.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A docking station adapted for convenient one-hand docking and undocking of a portable printer, the portable printer comprising a printhead, media drive, and media support, the portable printer being externally configured to be latched onto the docking station, said docking station comprising:

a base member having a first surface configured to receive the portable printer; and a latching mechanism including a manually operable actuator and coupled thereto one or more latches adapted to automatically engage and securely dock the portable printer on the first surface of the base member when the printer is positioned on the first surface, wherein the actuator is capable of actuating the one or more latches to unlatch a latched printer and to bias the printer outwardly from the base member for removal of the printer from the station, and wherein the latching mechanism includes a locking mechanism configured to prevent self-relatching of the printer during undocking.

2. The docking station according to claim 1, wherein the locking mechanism includes an actuator which is inserted through the first surface of the base member and into engagement with the printer to bias the printer outwards against self relatching.

3. The docking station according to claim 1, wherein the portable printer is aligned for cooperative engagement with the docking station latching mechanism by an alignment configuration including at least one tapered post projecting forwardly from a back region of the base member for engagement with a recess on a back surface of the printer.

4. The docking station according to claim 1, wherein the first surface of the base member has at least one surface portion which is raised to reduce friction forces encountered when the printer is slid rearwardly into the docking station.

5. The docking station according to claim 1, wherein the first surface of the base member has a concave dished configuration adapted to mate with a convex printer bottom surface, the concave dished configuration causing the printer to self align with the docking station during docking.

6. The docking station according to claim 1, wherein the base member includes at least one resilient structure which extends above the top surface of the housing and which is compressed as the printer is latched and docked.

7. The docking station according to claim 6, wherein the at least one resilient structure comprises a pair of spaced rubber raised portions.

8. The docking station according to claim 1, wherein the first surface of the base member has an electrical connector projecting therefrom with a tapered body adapted to guide the connector into a mating opening in a bottom wall of a printer during docking.

9. The docking station according to claim 1, wherein the first surface of the base member has a slot to pass fanfold paper to the portable printer while the portable printer is docked.

10. A docking station for an electronic device comprising:

a base member;

a latching mechanism positioned within the base member and operable to move from an engaging position to a non-engaging position, the latching mechanism capable of securing the electronic device to the base member in the engaging position, wherein the latching mechanism comprises a push button coupled to one or more latches, and wherein the push button is operable to move the one or more latches linearly from the engaging position to the non-engaging position; and a locking mechanism positioned within the base member, wherein the locking mechanism is coupled to the latching mechanism and is operable to lock the latching mechanism in the non-engaging position when the electronic device is undocked and unlock the latching mechanism when the electronic device is docked.

11. The docking station according to claim 10, wherein the latching mechanism further comprises a tension spring, and wherein the tension spring is capable of biasing the latching mechanism linearly to the engaging position while the locking mechanism is unlocked.

12. The docking station according to claim 10, further comprising an actuator operable to move the locking mechanism to lock and unlock the latching mechanism in response to biasing of the electronic device on the actuator.

13. The docking station according to claim 12, wherein the locking mechanism comprises a lever coupled to the actuator and to a compression spring, and wherein the lever is operable to pivot between a locking position and an unlocking position in response to biasing of the compression spring.

14. The docking station according to claim 13, wherein the locking position corresponds to the non-engaging position, and wherein the actuator is capable of biasing the electronic device outwardly from the base member in the non-engaging position in response to biasing of the compression spring.

15. The docking station according to claim 10, further comprising at least one docking connector defined in the base member, the docking connector operable to engage a corresponding connector on the electronic device in the engaging position.

16. The docking station according to claim 15, wherein the docking connector is capable of being in electronic communication with the electronic device.

17. The docking station according to claim 15, wherein said base member comprises a first surface upon which the electronic device is capable of at least partially resting, and wherein the docking connector is integral with the base member and extends to a position located above the first surface of the base member.

18. The docking station according to claim 10, wherein said base member comprises a first surface upon which the electronic device is capable of at least partially resting, wherein the first surface comprises first and second ends, and lateral edges extending between the first and second ends, and wherein at least a portion of the lateral edges and the first and second ends extend above the first surface to define a cradle, the electronic device capable of being positioned within the cradle.

19. The docking station according to claim 18, wherein the first surface slopes downwardly in a direction extending from the first end to the second end.

20. The docking station according to claim 19, further comprising a recess defined in the second end, the recess extending from a position located above the first surface to a position proximate to the first surface.

21. The docking station according to claim 18, further comprising one or more locators defined in the second end, the locators capable of engaging the electronic device while the electronic device is positioned within the cradle.

22. The docking station according to claim 18, further comprising a plurality of vents defined in the lateral edges of the base member, the vents capable of providing cooling to the electronic device and base member.

23. The docking station according to claim 10, wherein said base member comprises a first surface upon which the electronic device is capable of at least partially resting and a raised surface defined in the first surface, the raised surface capable of promoting sliding between the electronic device and the raised surface.

24. The docking station according to claim 10, wherein said base member comprises a first surface upon which the electronic device is capable of at least partially resting, and one or more bumpers positioned on the first surface, the bumpers capable of providing pressure on a bottom surface of the electronic device while the latching mechanism is in the engaging position.

25. The docking station according to claim 10, wherein the latching mechanism is operable to secure a portable printer in the engaging position.

26. The docking station according to claim 25, wherein said base member comprises a first surface upon which the electronic device is capable of at least partially resting and a slot defined in the first surface, the slot capable of receiving a printable material.

27. A docking station for an electronic device comprising:

a base member;

a latching mechanism positioned within the base member and operable to move from an engaging position to a non-engaging position, the latching mechanism capable of securing the electronic device to the base member in the engaging position;

a locking mechanism positioned within the base member, wherein the locking mechanism is coupled to the latching mechanism and is operable to lock the latching mechanism in the non-engaging position; and an actuator operable to move the locking mechanism to lock and unlock the latching mechanism from the non-engaging position in response to biasing of the electronic device on the actuator.

28. The docking station according to claim 27, wherein the latching mechanism comprises a push button coupled to one or more latches, and wherein the push button is operable to move the one or more latches linearly from the engaging position to the non-engaging position.

29. The docking station according to claim 28, wherein the latching mechanism further comprises a tension spring, and wherein the tension spring is capable of biasing the latching mechanism linearly to the engaging position while the locking mechanism is unlocked.

30. The docking station according to claim 27, wherein the locking mechanism comprises a lever coupled to the actuator and to a compression spring, and wherein the lever is operable to pivot between a locking position and an unlocking position in response to biasing of the compression spring.

31. The docking station according to claim 30, wherein the locking position corresponds to the non-engaging position, and wherein the actuator is capable of biasing the electronic device outwardly from the base member in the non-engaging position in response to biasing of the compression spring.

32. The docking station according to claim 30, wherein the actuator is capable of unlocking the latching mechanism from the non-engaging position upon biasing of the electronic device on the actuator.

33. A method for docking and undocking an electronic device in a docking station comprising:

providing a latching mechanism positioned within a base member;

providing a locking mechanism coupled to the latching mechanism and positioned within the base member;

unlocking the locking mechanism such that the latching mechanism moves from a non-engaging position to an engaging position, wherein unlocking further comprises biasing the electronic device on an actuator coupled to the locking mechanism, actuating the latching mechanism such that the latching mechanism moves from the engaging position to the non-engaging position; and locking the latching mechanism in the non-engaging position with the locking mechanism.

34. The method according to claim 33, wherein locking further comprises biasing the electronic device outwardly from the base member with the actuator coupled to the locking mechanism.

35. The method according to claim 33, wherein actuating the latching mechanism comprises actuating a push button coupled to one or more latches to move the one or more latches linearly to the non-engaging position.

36. A docking station for an electronic device comprising:

a base member having a first surface upon which the electronic device is capable of at least partially resting;

a latching mechanism positioned within the base member and including one or more latches, the one or more latches operable to move from an engaging position to a non-engaging position, wherein the one or more latches are capable of securing the electronic device to the base member in the engaging position; and an actuator operable to lock and unlock the one or more latches from the non-engaging position, the one or more latches and actuator capable of biasing the electronic device outwardly from the base member in a non-engaging position.

37. A docking station for an electronic device comprising:

a base member comprising a first surface upon which the electronic device is capable of at least partially resting, wherein the first surface comprises first and second ends, and lateral edges extending between the first and second ends, and wherein at least a portion of the lateral edges and the first and second ends extend above the first surface to define a cradle, the electronic device capable of being positioned within the cradle;

a latching mechanism positioned within the base member and operable to move from an engaging position to a non-engaging position, the latching mechanism capable of securing the electronic device to the base member in the engaging position; and a locking mechanism positioned within the base member, wherein the locking mechanism is coupled to the latching mechanism and is operable to lock the latching mechanism in the non-engaging position when the electronic device is undocked and unlock the latching mechanism when the electronic device is docked.

38. A method for docking and undocking an electronic device in a docking station comprising:

providing a latching mechanism positioned within a base member;

providing a locking mechanism coupled to the latching mechanism and positioned within the base member;

unlocking the locking mechanism such that the latching mechanism moves from a non-engaging position to an engaging position, actuating the latching mechanism such that the latching mechanism moves from the engaging position to the non-engaging position, wherein actuating the latching mechanism comprises actuating a push button coupled to one or more latches to move the one or more latches linearly to the non-engaging position; and locking the latching mechanism in the non-engaging position with the locking mechanism.

* * * * *